US 8,897,341 B2

(12) United States Patent
Anda et al.

(10) Patent No.: US 8,897,341 B2
(45) Date of Patent: Nov. 25, 2014

(54) SYSTEM AND METHOD FOR TESTING TIMING OPERATIONS OF A PULSE-BASED TRANSCEIVER

(75) Inventors: Barney Edward Anda, San Diego, CA (US); Jorge A. Garcia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 13/176,345

(22) Filed: Jul. 5, 2011

(65) Prior Publication Data
US 2013/0003787 A1 Jan. 3, 2013

Related U.S. Application Data

(60) Provisional application No. 61/502,035, filed on Jun. 28, 2011.

(51) Int. Cl.
*H04B 17/00* (2006.01)
*H04B 1/7163* (2011.01)
*H04B 1/7183* (2011.01)

(52) U.S. Cl.
CPC ............ *H04B 1/7163* (2013.01); *H04B 1/7183* (2013.01)
USPC .......................................... 375/219; 375/220

(58) Field of Classification Search
CPC ...... H04B 1/7163; A01M 1/026; A01M 1/24; G01N 33/46; G01N 22/00; G01S 1/045
USPC ............ 375/219, 220; 455/509, 513, 516, 73; 370/252; 710/1
See application file for complete search history.

(56) References Cited

U.S. PATENT DOCUMENTS

| 6,331,999 | B1 * | 12/2001 | Ducaroir et al. ............... 375/226 |
| 6,553,505 | B1 | 4/2003 | Brown et al. |
| 7,111,208 | B2 | 9/2006 | Hoang et al. |
| 7,124,334 | B2 | 10/2006 | Kashiwakura |
| 7,340,662 | B1 * | 3/2008 | McElwee et al. ............... 714/742 |
| 7,346,819 | B2 | 3/2008 | Bansal et al. |

(Continued)

FOREIGN PATENT DOCUMENTS

EP 1770409 A1 4/2007

OTHER PUBLICATIONS

International Search Report and Written Opinion—PCT/US2011/052044—ISA/EPO—Mar. 27, 2013.

*Primary Examiner* — Dhaval Patel
*Assistant Examiner* — Helene Tayong
(74) *Attorney, Agent, or Firm* — Paul S. Holdaway (57) ABSTRACT

The disclosure relates to an apparatus and method of testing timing associated with the transmission and reception of a pulse signal. With regard to testing the transmission of the signal, a transmitter transmits a pulse within a selected hop offset subinterval of a hop interval. The receiver takes samples of the received signal for the entire duration of the hop interval. Successful timing operation is indicated when samples indicate a pulse received within the selected subinterval, and no pulses received within other subintervals of the hop interval. With regard to testing the reception of the signal, a transmitter transmits pulses within respective hop offset subintervals of a hop interval. The receiver is enabled only for the duration of a selected subinterval, but samples are taken for the entire duration of the hop interval. Successful timing operation is indicated when the samples indicate a pulse received within the selected subinterval, and no pulses received within other subintervals.

24 Claims, 8 Drawing Sheets

(56) References Cited

U.S. PATENT DOCUMENTS

| | | |
|---|---|---|
| 7,379,716 B2 | 5/2008 | Eisenstadt et al. |
| 7,477,875 B2 | 1/2009 | Zhang et al. |
| 2002/0173323 A1* | 11/2002 | Tateson .................. 455/509 |
| 2004/0121733 A1* | 6/2004 | Peng ...................... 455/66.1 |
| 2009/0110040 A1 | 4/2009 | Jang |
| 2011/0058623 A1 | 3/2011 | Segoria et al. |
| 2011/0294449 A1* | 12/2011 | Budianu et al. ............ 455/245.1 |
| 2012/0224497 A1* | 9/2012 | Lindoff et al. ................ 370/252 |

* cited by examiner

SYSTEM AND METHOD FOR TESTING TIMING OPERATIONS OF A PULSE-BASED TRANSCEIVER

CROSS REFERENCE TO A RELATED APPLICATION

This application claims the benefit of the filing date of U.S. Provisional Application, Ser. No. 61/502,035, filed on Jun. 28, 2011, which is incorporated herein by reference.

FIELD

The present disclosure relates generally to communication systems, and more specifically, to a system and method for testing timing operations and/or other operating conditions of a pulse-based transceiver.

BACKGROUND

In communication systems, signals are often transmitted from a communication device to a remote communication device via a wireless medium. These communication devices typically employ a transceiver including a transmitter for transmitting signals and a receiver for receiving signals. In many cases, the transceiver is operated continuously whether or not signals are being transmitted or received. In some cases, operating a transceiver in a continuous manner may be acceptable. However, in other cases, such as when a limited power source (e.g., a battery) is used, this may not be desirable since the transceiver may not be able to operate continuously for long periods.

For instance, many communication devices are portable devices, such as cellular telephones, smart phones, personal digital assistants (PDAs), handheld devices, and other portable communication devices. These portable communication devices typically rely on a limited power source, such as a battery, to perform the various intended operations. A limited power source typically has a continuous use life that depends on the amount of power used by the portable device. It is generally desirable to extend the continuous use life as much as possible. Accordingly, portable communication devices are more frequently designed for improved power efficiency.

One technique for operating a transceiver in a more power efficient manner is to use pulse-based modulation and multiple access techniques to transmit and receive signals. In such a system, a transmitter may be operated in a relatively high power consumption mode during the transmission of a pulse signal. However, when the transmitter is not being used to transmit the pulse signal, it is operated in a relatively low power consumption mode in order to conserve power. Similarly, in such a system, a receiver may be operated in a relatively high power consumption mode during the reception of a pulse signal, and in a relatively low power consumption mode when the pulse signal is not being received.

As discussed above, these types of transceivers typically use pulse modulation to communicate data between devices, and orthogonal hopping pulse sequences to distinguish user devices. These types of modulation and device differentiating techniques typically rely on precise timing of the transmission and reception of pulses in order to effectuate the communication of data and the discerning of the data's originator. Accordingly, ensuring the precise timing of the transmission and reception of pulses by a transceiver is of concern.

SUMMARY

An aspect of the disclosure relates to a method of testing a transceiver. The method comprises transmitting a signal at a first time, receiving the signal at a second time, and determining an operating condition of the transceiver based on the first and second times. In some aspect, the signal comprises one or more pulses, such as ultra-wideband (UWB) pulses.

In another aspect of the disclosure, transmitting the signal at the first time occurs within a time interval based on a clock signal. In some aspect, transmitting the signal at the first time occurs within a subinterval of the time interval. In some aspect, receiving the signal at the second time occurs within the time interval.

In another aspect of the disclosure, determining the operating condition of the transceiver comprises generating samples of the received signal within the time interval, and analyzing the samples to determine the second time of the received signal within the time interval. In some aspect, the method further comprises enabling at least one component associated with receiving the signal during an entire duration of the time interval.

In another aspect of the disclosure, the operating condition comprises a first timing associated with the transmitting the signal, a second timing associated with receiving the signal, or a third timing associated with transmitting and receiving the signal. In some aspect, the method further comprises providing an indication based on the determination of the operating condition.

In another aspect of the disclosure, the method comprises enabling at least one component associated with transmitting the signal only during the transmission of the pulse, and disabling at least one component if the pulse is not being transmitted. In some aspect, transmitting the signal comprises transmitting pulses within subintervals of a time interval, respectively. In some aspect, receiving the signal comprises enabling at least one component associated with receiving the signal for only a duration of one of the subintervals of the time interval, and generating samples of the received signal for an entire duration of the time interval.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
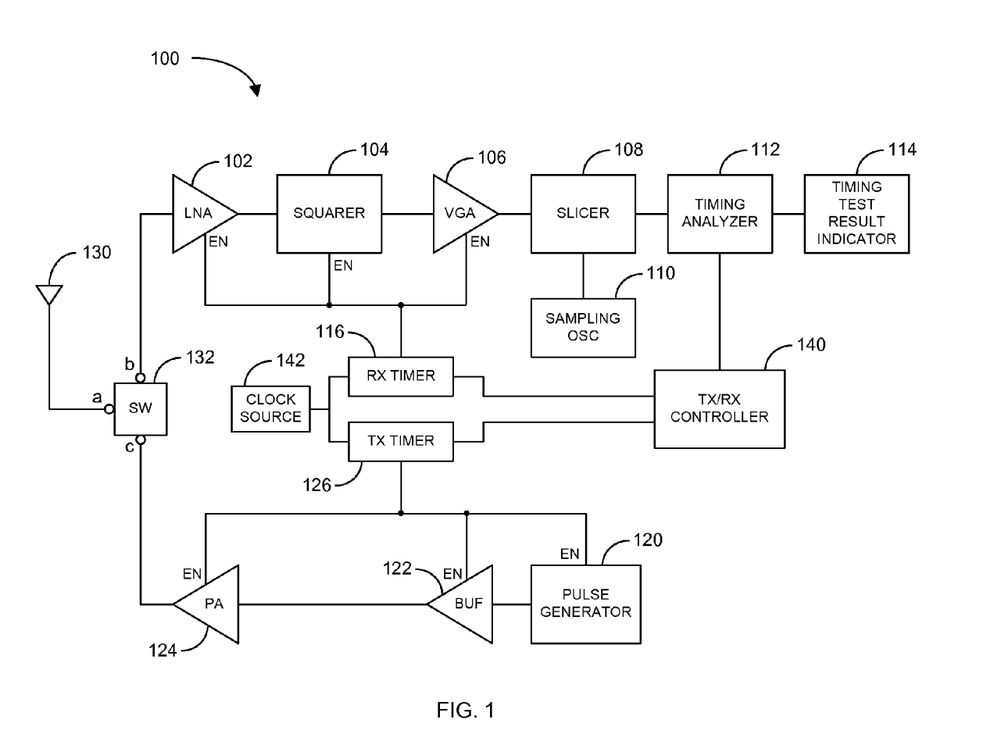
FIG. 1 illustrates a block diagram of an exemplary transceiver for generating and receiving a pulse signal in accordance with an aspect of the disclosure.

FIG. 1 illustrates a block diagram of an exemplary transceiver 100 for generating and receiving a test pulse signal in accordance with an aspect of the disclosure. In summary, the transceiver 100 is configured to determine one or more operating conditions of the transceiver by transmitting a test pulse signal, and receiving and processing the test pulse signal. An example of an operating condition that can be determined using this technique is the accuracy of the timing of the transmission of the test pulse signal. Another example of an operating condition that can be determined using this technique is the accuracy of the timing of the reception of the test pulse signal. Other operating conditions may be determined using this technique.

In particular, the transceiver 100 comprises a transmitter including a pulse generator 120, a buffer amplifier 122, a power amplifier (PA) 124, and a transmitter (Tx) timer 126. Also, the transceiver 100 comprises a receiver including a low noise amplifier (LNA) 102, a squarer 104, a variable gain amplifier (VGA) 106, a slicer 108, a sampling oscillator 110, and a receiver (Rx) timer 116. Additionally, the transceiver 100 comprises circuitry for controlling the transmission and reception of the test pulse signal, such as, the transmit (Tx)/receive (Rx) controller 140, and a clock source 142. Further, the transceiver 100 comprises circuitry for transmitting and receiving signals to and from external devices via a wireless medium, and routing signals from the transmitter to the receiver. Such circuitry includes an antenna 130 and a switch 132. Also, the transceiver 100 comprises circuitry for determining one or more operating conditions of the transceiver 100, such as a timing analyzer 112 and a timing test result indicator 114.

More specifically, the transmitter is adapted to transmit one or more pulses, such as ultra wideband (UWB) pulses, that can be used to communicate with other wireless devices, and also to determine one or more operating conditions of the transceiver 100. In this regard, the Tx/Rx controller 140 is adapted to initiate the transmission of a pulse. The Tx/Rx controller 140 initiates the transmission of a pulse by sending an instruction to the Tx timer 126. In response to the instruction, the Tx timer 126 generates an enable signal (EN), based on a clock signal generated by the clock source 142 and the instruction, that enables the pulse generator 120, buffer amplifier 122, and PA 124. In response to the EN signal, the pulse generator 120 generates a pulse, which is applied to the PA 124 by way of buffer amplifier 122. The PA 124, in turn, amplifies the pulse to an appropriate level for either transmission to a remote wireless device or transmission to the receiver-side of the transceiver 100. In the case of the pulse signal being transmitted directly to the receiver-side of the transceiver 100, the gain of the PA 124 may be set to a defined minimum or relatively low value in order to prevent or reduce signal compression in any of the receiver components.

If the pulse signal is to be transmitted to an external wireless device via the antenna 130, the switch 132 is configured to couple node "c" to node "a", and decouple node "b" from both nodes "a" and "c". On the other hand, if the pulse signal is to be transmitted directly to the receiver-side of the transceiver 100, the switch 132 is configured to couple node "c" to node "b", and decouple node "a" from both nodes "b" and "c". In the case that the receiver-side of the transceiver 100 is to receive a pulse signal from an external wireless device via the antenna 130, the switch 132 is configured to couple node "a" to node "b", and decouple node "c" from both nodes "a" and "b".

The receiver of the transceiver 100 is adapted to receive a pulse signal from either an external wireless device or the transmitter-side of the transceiver. In this regards, the Tx/Rx controller 140 is adapted to initiate the reception of a pulse. The Tx/Rx controller 140 initiates the reception of a pulse by sending an instruction to the Rx timer 116. In response to the instruction, the Rx timer 116 generates an enable signal (EN) based on the clock signal generated by the clock source 142 and the instruction, that enables the LNA 102, squarer 104, and VGA 106. In response to the EN signal, the LNA 102 amplifies the received pulse signal to an appropriate level based on whether the signal was received from a remote wireless device or the transmitter-side of the transceiver 100. In the case where the pulse signal was received from the transmitter-side of the transceiver 100, the gain of the LNA 102 may be set to a defined minimum or relatively low value in order to prevent or reduce signal compression in any receiver component. The squarer 104 squares the amplified pulse signal in order to generate a signal that varies as a function of the energy of the received pulse signal. The VGA 106 further amplifies the squared signal to a level appropriate for the slicer 108. The slicer 108 samples and performs a 1-bit digital conversion of the received signal based on a sampling clock generated by the sampling oscillator 110.

The timing analyzer 112 is adapted to analyze the slices of the received signal to determine one or more operating conditions of the transceiver 100. As discussed in more detail below, if the operation condition of the transceiver 100 that is being determined is the timing of the transmission of the pulses, then the timing analyzer 112 analyzes the received signal slices to determine if a pulse was transmitted within a particular hop offset subinterval of a hop interval, and no pulses were transmitted within other hop offset subintervals of the hop interval. Similarly, if the operation condition of the transceiver 100 that is being determined is the timing of the reception of the pulses, then the timing analyzer 112 analyzes the received signal slices to determine if a pulse was received within a particular hop offset subinterval of a hop interval, and no pulses were received within other hop offset subintervals of the hop interval.

The timing analyzer 112 instructs the Tx/Rx controller 140 to control the transmission and reception of a pulse signal pursuant to the test or determination being conducted. It shall be understood that the timing analyzer 112 may be adapted to determine other operating conditions of the transceiver 100 by analyzing the slices of the received signal. The timing test result indicator 114 is adapted to generate an indication of the test result conducted by the timing analyzer 112. For instance, the indicator 114 may be any one or more of the following: a display, a transducer such as a speaker, a touch sensory system, a temperature sensory system, other somatosensory system, a controller, etc. Alternatively, or in addition to, the indicator 114 may provide an indication by sending a packet via a serial or other port, by interrogating a particular memory device, or performing some other operation.

Although in the examples described herein, the test pulse signal transmitted by the transmitter-side of the transceiver 100 is received by the receiver-side of the transceiver, it shall be understood that external equipment may be used to receive and process the transmitted test pulse signal in order to determine one or more operating conditions associated with the transmitter-side of the transceiver. Alternatively, or in addition to, it shall be understood that external equipment may be used to transmit a test pulse signal to the receiver-side of the transceiver 100 in order to determine one or more operating conditions associated with the receiver-side of the transceiver.

Additionally, with reference to FIG. 1, a means for transmitting a signal may include any one or more of the following: the pulse generator 120, the buffer 122, the power amplifier (PA) 124, the transmitter (TX) timer 126, the clock source 142, and the transmit/receive (TX/RX) controller 140. A means for receiving a signal may include any one or more of the following: the low noise amplifier (LNA) 102, the squarer 104, the variable gain amplifier (VGA) 106, the receive (RX) timer 116, the slicer 108, the sampling oscillator 110, the clock source 142, and the transmit/receive (TX/RX) controller 140. A means for determining an operating condition may include the timing analyzer 112. A means for generating samples may include one or more of the following: the slicer 108 and the sampling oscillator 110. A means for analyzing the samples may include the timing analyzer 112. A means for enabling at least one component of the receiving means may include one or more of the following: the TX/RX controller 140, the clock source 142, and the RX timer 116. A means for providing an indication may include the timing test result indicator 114. A means for enabling or disabling at least one component of the transmitting means may include one or more of the following: the TX/RX controller 140, the clock source 142, and the TX timer 126.

Figure 2A:
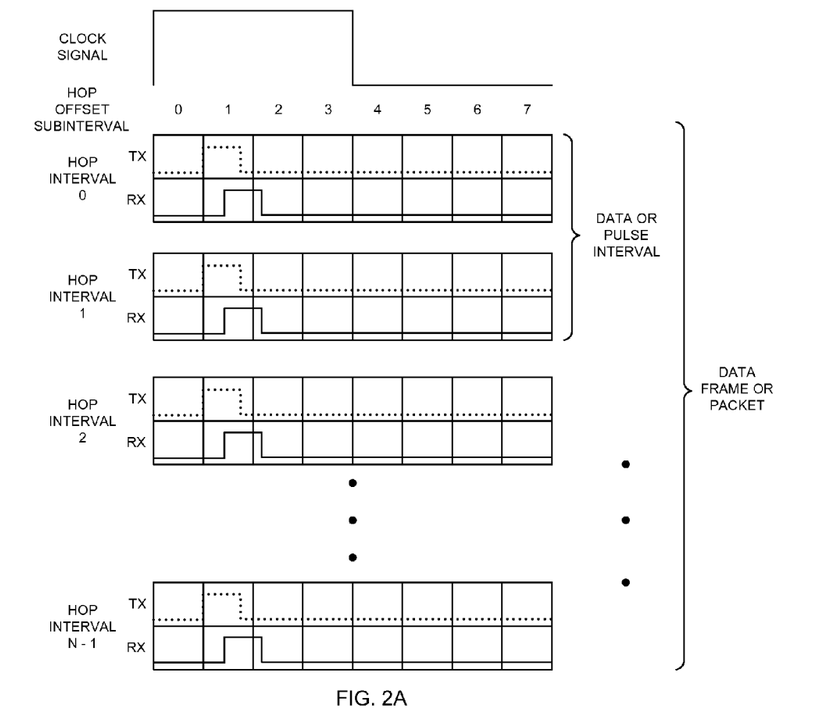
FIG. 2A illustrates a diagram depicting a relationship between exemplary clock signal, hop interval, hop offset subinterval, test transmit signal, and test receive signal in accordance with another aspect of the disclosure.

FIG. 2A illustrates a diagram depicting a relationship between exemplary clock signal, hop interval, hop offset subinterval, test transmit signal, and test receive signal in accordance with another aspect of the disclosure. The top graph in the diagram depicts an exemplary clock signal that may be generated by clock source 142. As illustrated, the clock signal may be substantially periodic and square-wave in shape. In this example, a period of the clock signal may substantially correspond to a duration of a hop interval. Below the graph of the clock signal are N exemplary hop intervals illustrated. Each hop interval may be comprised of eight (8) hop offset subintervals, labeled 0-7.

As an example, hop offset subintervals may be used to distinguish pulses transmitted and/or received from different users. In a simple implementation, a first user may be assigned to transmit and receive pulses within hop offset subinterval (2), while a second user may be assigned to transmit and receive pulses within hop offset subinterval (4). In a more complex implementation, a first user may be assigned a first hopping (e.g., pseudorandom) sequence of N hop offset subintervals, and a second user may be assigned a second and different hopping (e.g., pseudorandom) sequence of N hop offset subintervals. The first and second hopping sequences may be configured orthogonal to each other in order to prevent or minimize pulse collisions. Two consecutive or adjacent hop intervals may be configured as a data or pulse interval. For instance, if a pulse is transmitted in hop interval (0), then at a receiver end, the pulse may be interpreted as a logic (0). Similarly, if a pulse is transmitted in hop interval (1), then at a receiver end, the pulse may be interpreted as a logic (1). For each data or pulse interval, a single pulse is transmitted within the assigned hop offset subinterval.

As an example, a data frame or packet may be configured to have 64 data or pulse intervals. As discussed above, a data or pulse interval may comprise two consecutive hop intervals. Accordingly, in this example, there are 128 hop intervals (e.g., N=128). Also, as previously discussed, each hop interval may comprise eight (8) hop offset subintervals. Thus, in this example, there are 1024 hop offset subintervals (e.g., 128×8). Further, in accordance with this example, the slicer 108 may be configured to generate 16 samples or slices per hop offset subinterval. Accordingly, in this example, the slicer 108 may generate 16,384 slices per data frame or packet (1024×16).

In accordance with a testing of an exemplary operating condition of the transceiver 100, such as the transmission of a pulse, the Tx/Rx controller 140 may be operated to cause the transmitter to transmit a pulse at hop offset subinterval (1) for all hop interval in a data frame or packet. The transmitted pulse is illustrated as a dotted line in the top or Tx portion of each hop interval. During proper operation of the transceiver 100, the transmitted pulse should be received by the receiver after a relatively small delay from the transmission of the pulse. The received pulse is illustrated as a solid line in the bottom or Rx portion of each hop interval. For example, a successful result may be indicated when only a single pulse is detected at the receiver within a hop offset subinterval based on the hop offset subinterval in which the transmitted pulse was sent (e.g., the same hop offset subinterval). This test may be repeated for each hop offset and for each Tx timer 126 if there are multiple timers.

Figure 2B:
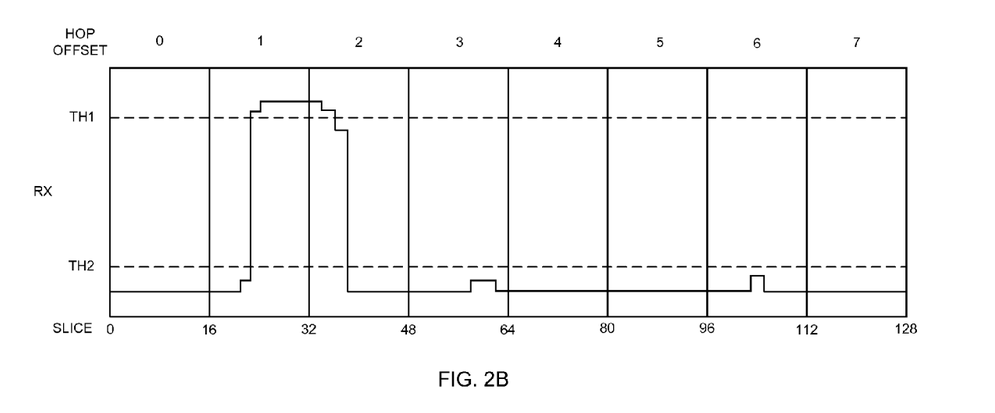
FIG. 2B illustrates an exemplary test receive signal in accordance with another aspect of the disclosure.

FIG. 2B illustrates an exemplary test receive signal in accordance with another aspect of the disclosure. As previously discussed, the slicer 108 may generate 128 slices per each hop interval. Then, the timing analyzer 112 generates a running count of the slice value for each slice position for the hop intervals in a data frame or packet. For instance, the maximum for the running count of the slice value for a particular position is 128 because there are 128 hop intervals, and the slice value for each position is either a one (1) or zero (0). An upper threshold TH1 may be set to a specified high percentage (e.g., 80%) of the maximum value (e.g., 128), such as 102 (e.g., ~80% of 128). A lower threshold TH2 may be set to a specified low percentage (e.g., 20%) of the maximum value (e.g., 128), such as 26 (e.g., ~20% of 128). The upper threshold TH1 may be set based on historical, actual and/or estimated values of running counts associated with a successful reception of pulses. The lower threshold TH2 may be set based on historical, actual and/or estimated values of running counts associated with noise present in the received signal.

A successful result may be indicated as follows: (1) the running count(s) for one or more slice positions pertaining to a hop offset subinterval is equal to or above the upper threshold TH1, which indicates the presence of a pulse in that hop offset subinterval; (2) the hop offset subinterval indicative of having a pulse is consistent with the hop offset subinterval in which the pulse was transmitted (e.g., transmitted in hop offset subinterval (1) and received in hop offset subinterval (1)); (3) the running counts for all slice positions pertaining to other hop offset subintervals are equal to or below the lower threshold TH2, which indicates the absence of a pulse in those hop offset subintervals; and (4) the running counts for slice positions in the hop offset subinterval following the hop subinterval indicative of having a pulse are ignored to account for the pulse signal leaking into the following hop offset subinterval.

The example illustrated in FIG. 2B indicates a successful result. For instance, the running count of slice positions 23-31 within the hop offset subinterval (1) are equal to or above the upper threshold TH1, which indicates the presence of a pulse in that hop offset subinterval. The hop offset subinterval (1) corresponds to the hop offset subinterval (1) in which the pulse was transmitted. The other hop offset subintervals (0) and (3)-(7) indicate the absence of pulse by the corresponding running counts of all of their slice positions being equal to or below the lower threshold TH2. The running counts of the slice positions of the hop offset subinterval (2) following the hop offset subinterval (1) indicative of having a pulse are ignored due to signal leakage into that hop offset subinterval (2) as shown.

Additional information related to the operating condition of the transceiver may be obtained by analyzing the running counts of slice positions for one or more data frames or packets. For instance, the running counts may indicate variation or drift in the timing of the transmission of the pulses. Statistical information, such as standard deviation, may be obtained by analysis of the running counts of slice positions. This may be useful to further ascertain the operating condition of the transceiver.

Figure 3:
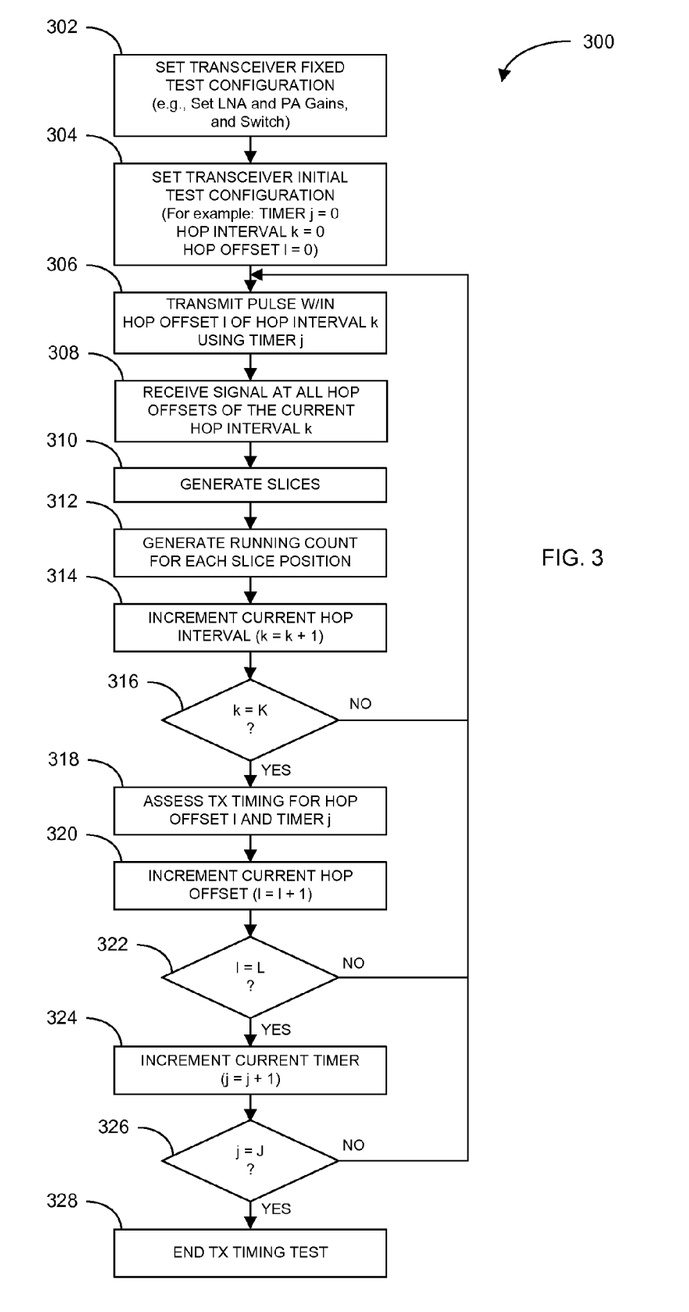
FIG. 3 illustrates a flow diagram of an exemplary method of testing a timing operation of a transmitter in accordance with another aspect of the disclosure.

FIG. 3 illustrates a flow diagram of an exemplary method 300 of testing a timing operation of a transmitter in accordance with another aspect of the disclosure. The method 300 is one example of a method for determining one or more operation conditions of the transceiver 100, as previously discussed. That is, the timing and other parameters associated with the transmission of a pulse may be determined by implementing the exemplary method 300.

In particular, according to the method 300, the transceiver 100 may be set to a fixed test configuration (block 302). For instance, in this regards, the LNA 102 and PA 124 may be set to respective specified minimal or relatively low gains in order to prevent too high signal levels at the receiver-side of the transceiver 100. This may be done to prevent significant signal compression at one or more components at the receiver-side of the transceiver 100. Additionally, the switch 132 may be configured to couple nodes "b" and "c", and decouple node "a" from both nodes "b" and "c". Such parameters may be fixed throughout the testing method 300.

Additionally, the transceiver 100 may be set to an initial test configuration (block 304). For instance, the current Tx timer j to be tested (e.g., Tx timer 0) may be set or enabled. Also, the current hop interval k to be tested (e.g., hop interval 0) may be set. Additionally, the current hop offset subinterval l to be tested (e.g., hop offset subinterval 0) may be set. As discussed below, such parameters may be changed throughout the testing method 300.

Then, according to the method 300, the transmitter-side of the transceiver 100 transmits a pulse within the current hop offset subinterval l of the current hop interval k using the current Tx timer j (block 306). That is, the pulse generator 120, buffer 122, and PA 124 are enabled only during the current hop offset subinterval l of the current hop interval k. These devices are disabled during the other hop offset subintervals of the current hop interval k. The receiver-side of the transceiver 100 is enabled to receive the signal from the transmitter-side for the entire duration of the current hop interval k (block 308). That is, the LNA 102, squarer 104, and VGA 106 are enabled for the entire duration of the current hop interval k.

Then, according to the method 300, the slicer 108 generates slices of the received signal for the entire duration of the current hop interval k (block 310). With regard to the example previously discussed, the slicer 108 may take 128 slices of the received signal per the current hop interval k. The timing analyzer 112 then generates a running count of the value of each of the slices (block 312). Then, in block 314, the variable k indicative of the current hop interval is incremented. And, in block 316, it is determined whether the new current hop interval k exceeds the number of hop intervals K−1 for a data frame or packet (e.g., K−1=128). If the current hop interval k does not exceed the number of hop intervals K−1 in a data frame or packet (e.g., k<K), then the operations pertaining to blocks 306 through 316 are repeated.

If, on the other hand, the current hop interval k does exceed the number of hop intervals K−1 in a data frame or packet (e.g., k=K), the timer analyzer 112 assesses the transmitter timing for the current hop offset subinterval l and Tx timer j by analyzing the running counts of the slices (block 318). As previously discussed with reference to FIGS. 2A-2B, the transmitter timing is running properly if the following criteria are met: (1) the running count(s) for one or more slice positions pertaining to the current hop offset subinterval l is equal to or above the upper threshold TH1, which indicates the presence of a pulse in that hop offset subinterval; (2) the running counts for all slice positions pertaining to other hop offset subintervals are equal to or below the lower threshold TH2, which indicates the absence of a pulse in those hop offset subintervals; and (3) the running counts for slice positions in the next hop offset subinterval l+1 are ignored to account for the pulse signal leaking into the following hop offset subinterval.

In block 320, the current hop offset subinterval l is incremented (e.g., l=l+1). Then, it is determined whether the new current hop offset subinterval l exceeds the number of hop offset subintervals L−1 in a hop interval (block 322). If not (e.g., l<L), the operations indicated in blocks 306 through 322 are repeated. On the other hand, if the current hop offset subinterval l exceeds the number of hop offsets subintervals L−1 in a hop interval (e.g., l=L), then the current timer j is incremented (e.g., j=j+1) (block 324). Then, it is determined whether the new current timer j exceeds the number of Tx timers J−1 to be tested (block 326). If not (e.g., j<J), the operations indicated in blocks 306 through 326 are repeated. On the other hand, if the current Tx timer j exceeds the number of Tx timers J−1 to be tested (e.g., j=J), then the transmitter timer testing operation may end (block 328).

Figure 4A:
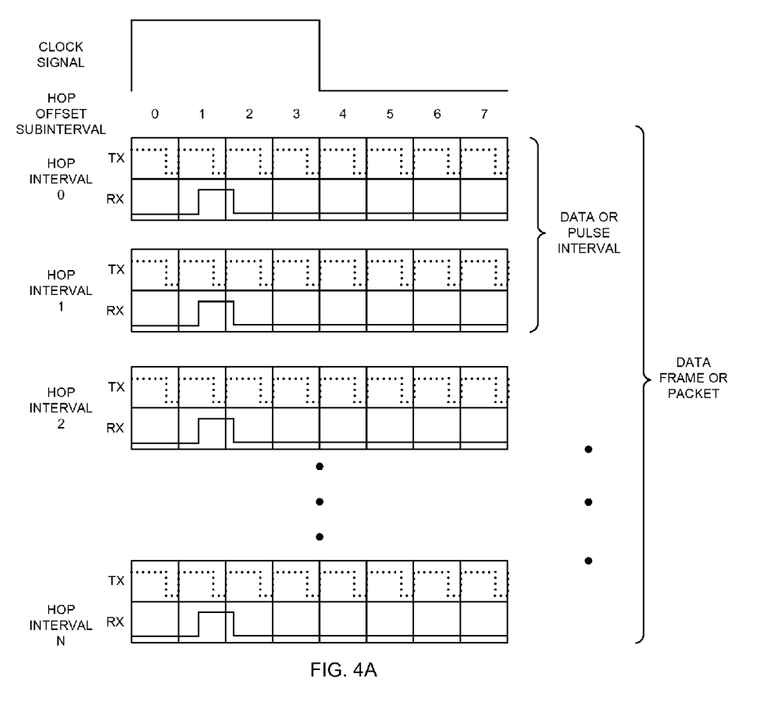
FIG. 4A illustrates a diagram depicting another relationship between exemplary clock signal, hop interval, hop offset subinterval, test transmit signal, and test receive signal in accordance with another aspect of the disclosure.

FIG. 4A illustrates a diagram depicting another relationship between exemplary clock signal, hop interval, hop offset subinterval, test transmit signal, and test receive signal in accordance with another aspect of the disclosure. This diagram is similar to the one depicted in FIG. 2A, and thus, the relationship between the clock signal, hop interval, and hop offset subinterval have been thoroughly discussed. The diagram of FIG. 4A differs from that of FIG. 2A in that the transmit signal is configured to test the Rx timer 116. In this example, the transmit signal consists of a plurality of pulses transmitted within all the hop offset subintervals of each hop interval, respectively. Further, in this example, the receiver (e.g., the LNA 102, squarer 104, and VGA 106) is enabled only for a duration of a selected hop offset subinterval and disabled for the remaining hop offset subintervals of each hop interval.

Figure 4B:
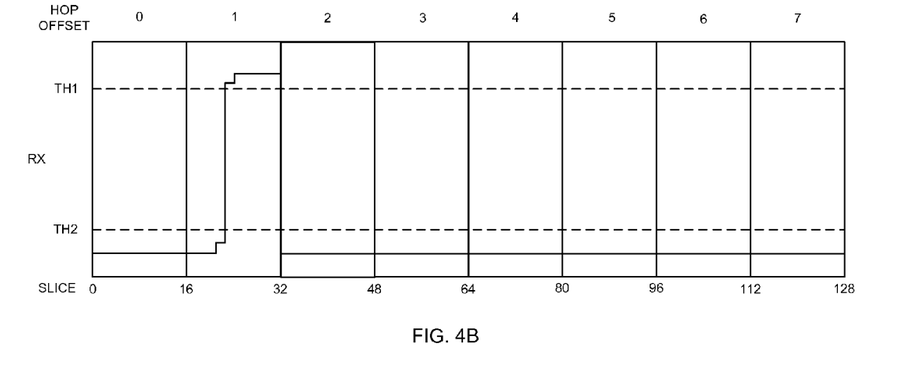
FIG. 4B illustrates an exemplary test receive signal in accordance with another aspect of the disclosure.

FIG. 4B illustrates an exemplary test receive signal in accordance with another aspect of the disclosure. The diagram of FIG. 4B is similar to the diagram of FIG. 2B because the criteria for a successful test of the Rx timer 116 are similar to the criteria for a successful test of the Tx timer 126. That is, a successful result may be indicated as follows: (1) the running count(s) for one or more slice positions pertaining to a hop offset subinterval is equal to or above the upper threshold TH1, which indicates the presence of a pulse in that hop offset subinterval; (2) the hop offset subinterval indicative of having a pulse is consistent with the hop offset subinterval in which the receiver was enabled; and (3) the running counts for all slice positions pertaining to other hop offset subintervals are equal to or below the lower threshold TH2, which indicates the absence of a pulse in those hop offset subintervals.

The example illustrated in FIG. 4B indicates a successful result. For instance, the running count of slice positions 23-31 within the hop offset subinterval (1) are equal to or above the upper threshold TH1, which indicates the presence of a pulse in that hop offset subinterval. The hop offset subinterval (1) corresponds to the hop offset subinterval (1) during which the receiver was enabled. The other hop offset subintervals (0) and (3)-(7) indicate the absence of pulse by the corresponding running counts of all of their slice positions being equal to or below the lower threshold TH2.

Figure 5:
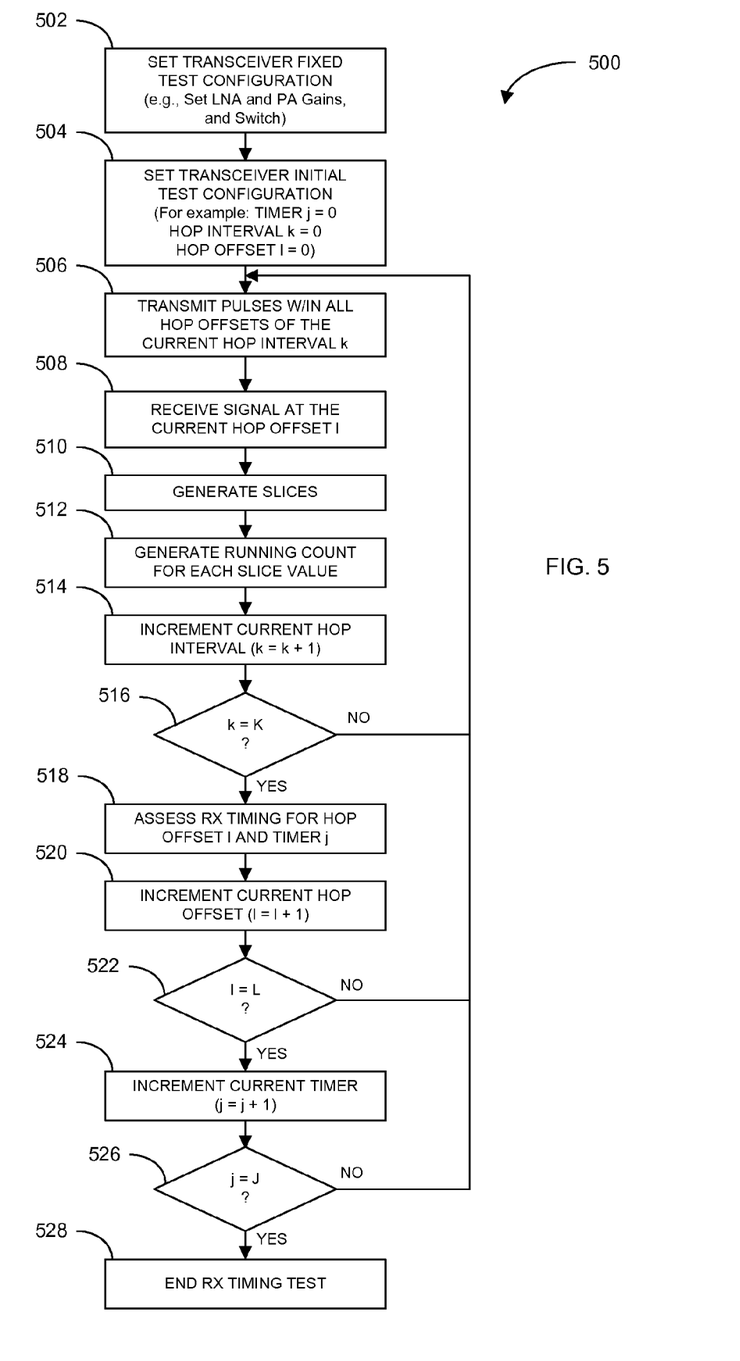
FIG. 5 illustrates a flow diagram of an exemplary method of testing a timing operation of a receiver in accordance with another aspect of the disclosure.

FIG. 5 illustrates a flow diagram of an exemplary method 500 of testing a timing operation of a receiver in accordance with another aspect of the disclosure. The method 500 is one example of a method for determining one or more operation conditions of the transceiver 100, as previously discussed. That is, the timing and other parameters associated with the reception of pulses may be determined by implementing the exemplary method 500.

In particular, according to the method 500, the transceiver 100 may be set to a fixed test configuration (block 502). For instance, in this regards, the LNA 102 and PA 124 may be set to respective specified minimal or relatively low gains in order to prevent too high signal levels at the receiver-side of the transceiver 100. This may be done to prevent significant signal compression at one or more components at the receiver-side of the transceiver 100. Additionally, the switch 132 is configured to couple nodes "b" and "c", and decouple node "a" from both nodes "b" and "c". Such parameters may be fixed throughout the testing method 500.

Additionally, the transceiver 100 may be set to an initial test configuration (block 504). For instance, the current Rx timer j to be tested (e.g., Rx timer 0) may be set or enabled. Also, the current hop interval k to be tested (e.g., hop interval 0) may be set. Additionally, the current hop offset subinterval l to be tested (e.g., hop offset subinterval 0) may be set. As discussed below, such initial parameters are changed throughout the testing method 500.

Then, according to the method 500, the transmitter-side of the transceiver 100 transmits respective pulses within every hop offset subinterval of the current hop interval k (block 506). That is, the pulse generator 120, buffer 122, and PA 124 are enabled throughout the entire duration of the current hop interval k. The receiver-side of the transceiver 100 is enabled to receive the signal from the transmitter-side for only the duration of the current hop offset subinterval l of the current hop interval k (block 508). That is, the LNA 102, squarer 104, and VGA 106 are enabled for only the duration of the current hop offset subinterval l of the current hop interval k. The receiver is disabled for the other hop offset subintervals of the current hop interval k.

Then, according to the method 500, the slicer 108 generates slices of the received signal for the entire duration of the current hop interval k (block 510). With regard to the example previously discussed, the slicer 108 may take 128 slices of the received signal per the current hop interval k. The timing analyzer 112 then generates a running count of the value of each of the slices (block 512). Then, in block 514, the variable k indicative of the current hop interval is incremented. And, in block 516, it is determined whether the new current hop interval k exceeds the number hop intervals K−1 for a data frame or packet. If the current hop interval k does not exceed the number of hop intervals K−1 in a data frame or packet (e.g., k<K), then the operations pertaining to blocks 506 through 516 are repeated.

If, on the other hand, the current hop interval k does exceed the number of hop intervals K−1 in a data frame or packet (e.g., k=K), the timer analyzer 112 assesses the receiver timing for the current hop offset subinterval l and Rx timer j by analyzing the running counts of the slice positions (block 518). As previously discussed with reference to FIGS. 4A-4B, the receiver timing is running properly if the following criteria are met: (1) the running count(s) for one or more slice positions pertaining to the current hop offset subinterval l is equal to or above the upper threshold TH1, which indicates the presence of a pulse in that hop offset subinterval; and (2) the running counts for all slice positions pertaining to other hop offset subintervals are equal to or below the lower threshold TH2, which indicates the absence of a pulse in those hop offset subintervals.

In block 520, the current hop offset subinterval l is incremented (e.g., l=l+1). Then, it is determined whether the new current hop offset subinterval l exceeds the number of hop offsets L−1 in a hop interval (block 522). If not (e.g., l<L), the operations indicated in blocks 506 through 522 are repeated. On the other hand, if the current hop offset l exceeds the number of hop offsets L−1 in a hop interval (e.g., l=L), then the current Rx timer j is incremented (e.g., j=j+1) (block 524). Then, it is determined whether the new current Rx timer j exceeds the number J−1 of Rx timers to be tested (block 526). If not (e.g., j<J), the operations indicated in blocks 506 through 524 are repeated. On the other hand, if the current Rx timer j exceeds the number J−1 of Rx timers to be tested (e.g., j=J), then the Rx timer testing operation may end (block 528).

Figure 6:
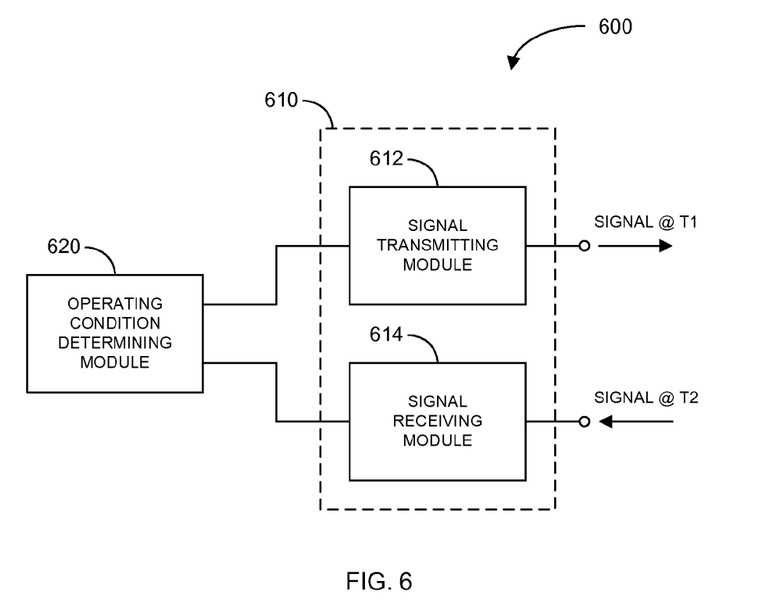
FIG. 6 illustrates a block diagram of an exemplary apparatus in accordance with another aspect of the disclosure.

FIG. 6 illustrates a block diagram of an exemplary apparatus 600 in accordance with another aspect of the disclosure. In general, the apparatus 600 is configured for determining an operating condition of a transceiver. The operating condition is based on a first time T1 associated with the transmission of a signal, and a second time T2 associated with the reception of the signal. More specifically, the operating condition is based on a comparison of the first and second times (T1 and T2).

In particular, the apparatus 600 comprises a transceiver 610 including a signal transmitting module 612 and a signal receiving module 614. The apparatus 600 also comprises an operating condition determining module 620 coupled to both the signal transmitting module 612 and the signal transmitting module 614. In operation, the signal transmitting module 612 transmits a signal at time T1. The signal receiving module 614 receives the signal at time T2. The operating condition determining module 620 determines an operation condition of the transceiver 610 based on a comparison of the first and second times (T1 and T2).

Figure 7:
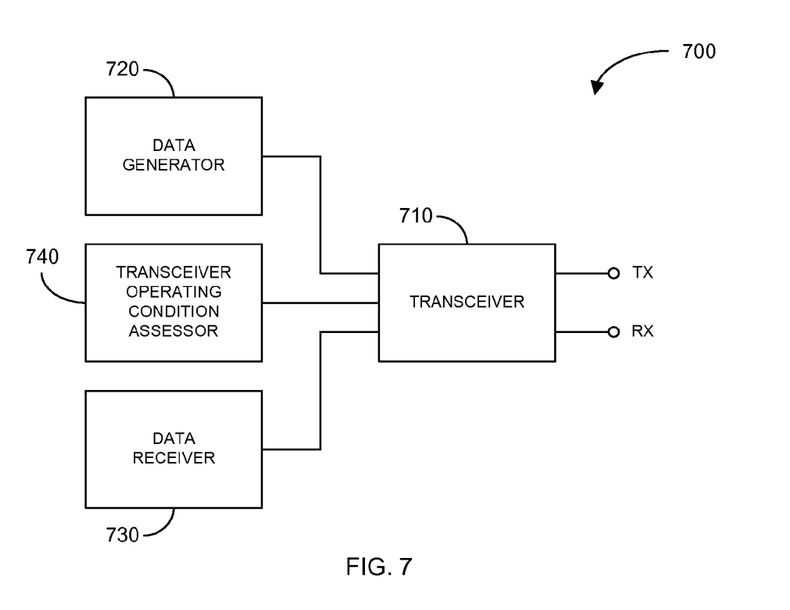
FIG. 7 illustrates a block diagram of another exemplary apparatus in accordance with another aspect of the disclosure.

FIG. 7 illustrates a block diagram of another exemplary apparatus 700 in accordance with another aspect of the disclosure. The apparatus 700 comprises a data generator 720, a data receiver 730, and a transceiver operating condition assessor 740, all of which are coupled to a transceiver 710. The transceiver operating condition assessor 740 determines one or more operating conditions of the transceiver 710, and may be implemented as described herein. The data generator 720 generates data for transmission by the transceiver 710 to a remote wireless device via a wireless medium. The data receiver 730 receives data received by the transceiver 710 from a remote wireless via the wireless medium.

The data generator 720 and the data receiver 730 may be implemented as specific devices depending on the application of the apparatus 700. For instance, if the apparatus 700 is implemented as a headset, the data generator 720 may be a data-generating transducer, such as a microphone, and the data receiver 730 may be a data-processing transducer, such as a speaker. Similarly, if the apparatus 700 is implemented as a watch, the data generator 720 may be a data-generating device, such as a keyboard or touch-sensitive display, and the data receiver 730 may be a user interface, such as a display. Likewise, if the apparatus 700 is implemented as a sensing device, the data generator 720 may be a data-generating device, such as a sensor, and the data receiver 730 may be a controller that controls the sensing operation.

The apparatus 700 may be implemented as many distinct devices, such as a gaming device, shoe, robotic or mechanical device responsive to data, a medical device, an audio device, an athletic monitoring device, and others. In such distinct devices, the data generator 720 and data receiver 730 may be implemented to complement the various distinct applications of the distinct devices. For instance, the data generator 720 and data receiver 730 may be separate or integrated devices, and may include a microprocessor, microcontroller, a reduced instruction set computer (RISC) processor, a display, an audio device, one or more light emitting diodes (LED), a user device, etc.

Figure 8A:
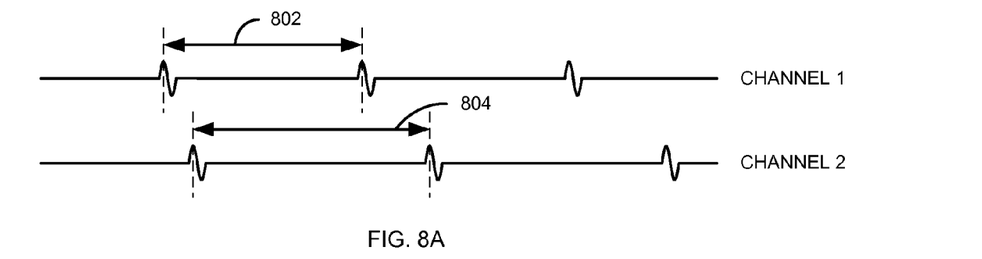
FIGS. 8A-D illustrate timing diagrams of various pulse modulation techniques in accordance with another aspect of the disclosure.

FIG. 8A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 802. Conversely, pulses for channel 2 have a pulse repetition frequency (PRF) corresponding to a pulse-to-pulse delay period 804. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 8B:
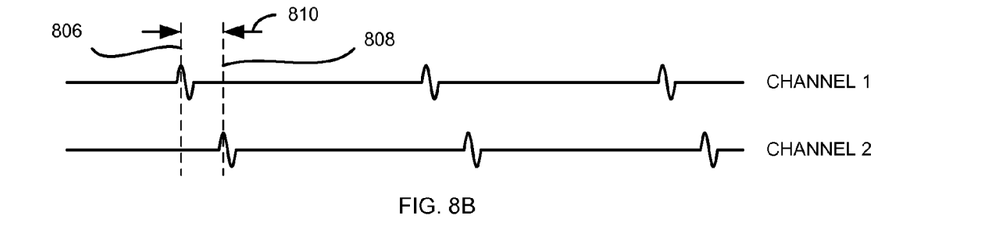

FIG. 8B illustrates different channels (channels 1 and 2) defined with different pulse positions or offsets as an example of a modulation that may be employed in any of the communications systems described herein. Pulses for channel 1 are generated at a point in time as represented by line 806 in accordance with a first pulse offset (e.g., with respect to a given point in time, not shown). Conversely, pulses for channel 2 are generated at a point in time as represented by line 808 in accordance with a second pulse offset. Given the pulse offset difference between the pulses (as represented by the arrows 810), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 8C:
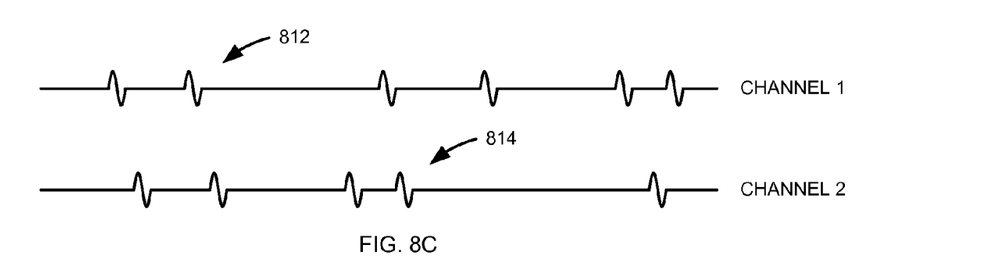

FIG. 8C illustrates different channels (channels 1 and 2) defined with different timing hopping sequences modulation that may be employed in any of the communications systems described herein. For example, pulses 812 for channel 1 may be generated at times in accordance with one time hopping sequence while pulses 814 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 8D:
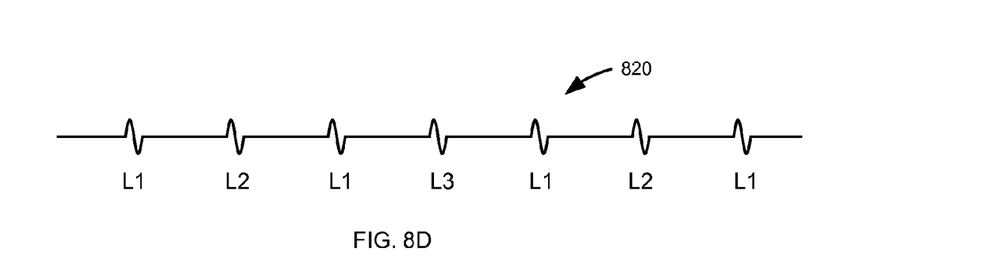

FIG. 8D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with other pulse modulation schemes. For example, a channel may be defined based on different spreading pseudo-random number sequences, or some other suitable parameter or parameters. Moreover, a channel may be defined based on a combination of two or more parameters.

Figure 9:
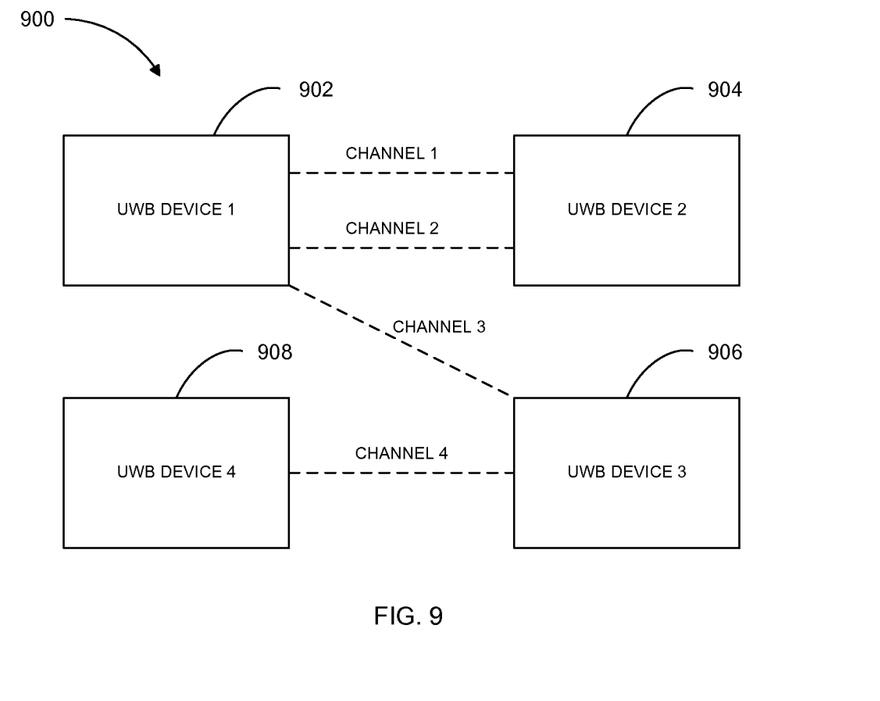
FIG. 9 illustrates a block diagram of various ultra-wide band (UWB) communications devices communicating with each other via various channels in accordance with another aspect of the disclosure.

FIG. 9 illustrates a block diagram of various ultra-wide band (UWB) communications devices communicating with each other via various channels in accordance with another aspect of the disclosure. For example, UWB device 1 902 is communicating with UWB device 2 904 via two concurrent UWB channels 1 and 2. UWB device 902 is communicating with UWB device 3 906 via a single channel 3. And, UWB device 3 906 is, in turn, communicating with UWB device 4 908 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

A processing system may include hardware, software, firmware or any combination thereof. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of testing a transceiver, comprising:
    transmitting a signal at a first time, wherein transmitting the signal at the first time comprises transmitting pulses during respective subintervals of a hop interval;
    receiving the signal at a second time, wherein receiving the signal at the second time comprises enabling the receiver for receiving the signal at the second time, wherein the second time is related to a selected one of the subintervals of the hop interval;
    generating samples of at least one of the pulses and noise during an entire duration of the hop interval; and
    determining an operating condition of the transceiver based on the first and second times, wherein the operating condition comprises a timing of enabling a transmitter of the transceiver for transmitting the signal or a timing of enabling a receiver of the transceiver for receiving the signal, wherein determining the timing of enabling the receiver comprises analyzing the samples to determine whether the at least one of the pulses was received during the selected subinterval of the hop interval.

2. The method of claim 1, wherein the hop interval is based on a clock signal.

3. The method of claim 1, wherein enabling the receiver comprises enabling at least one component associated with receiving the signal.

4. The method of claim 1, wherein the operating condition comprises a first timing associated with transmitting the signal, a second timing associated with receiving the signal, or a third timing associated with transmitting and receiving the signal.

5. The method of claim 1, wherein enabling the transmitter comprises enabling at least one component associated with transmitting the signal only during the transmission of the pulse; and
    further comprising disabling the at least one component if the pulse is not being transmitted.

6. The method of claim 1, wherein determining the timing of enabling the receiver comprises:
    defining a specified number of hop intervals including said hop interval, wherein each hop interval consists of a specified number of subintervals;
    wherein transmitting the signal at the first time comprises transmitting pulses during respective subintervals of each of the hop intervals;
    wherein receiving the signal at the second time comprises:
        enabling the receiver for receiving the signal at times related to selected subintervals of respective hop intervals; and
        generating samples of at least one of the pulses and noise during an entire duration of each of the hop intervals; and
    analyzing the samples.

7. The method of claim 6, wherein analyzing the samples comprises generating respective running counts of values of samples corresponding to distinct time positions within each hop interval, the running counts continually being updated for each of the specified number of hop intervals, wherein determining the timing of enabling the receiver comprises analyzing the running counts.

8. The method of claim 7, wherein analyzing the running counts comprises determining whether the running counts indicate that statistically the pulses were received during the selected subintervals of respective hop intervals.

9. An apparatus for testing a transceiver, comprising:
    a transmitter adapted to transmit a signal at a first time, wherein transmitting the signal at the first time comprises transmitting pulses during respective subintervals of a hop interval;
    a receiver adapted to receive the signal at a second time, wherein receiving the signal at the second time comprises enabling the receiver for receiving the signal at the second time, wherein the second time is related to a selected one of the subintervals of the hop interval;
    a sampling device configured to generate samples of at least one of the pulses and noise during an entire duration of the hop interval; and
    a processing system adapted to determine an operating condition of the transceiver based on the first and second times, wherein the operating condition comprises a timing of enabling the transmitter of the transceiver for transmitting the signal or a timing of enabling the receiver of the transceiver for receiving the signal, wherein the processing system is configured to determine the timing of enabling the receiver by at least analyzing the samples to determine whether the at least one of the pulses was received during the selected subinterval of the hop interval.

10. The apparatus of claim 9, wherein the hop interval is based on a clock signal.

11. The apparatus of claim 9, further comprising a controller adapted to enable at least one component of the receiver.

12. The apparatus of claim 9, wherein the operating condition comprises a first timing associated with transmitting the signal, a second timing associated with receiving the signal, or a third timing associated with transmitting and receiving the signal.

13. The apparatus of claim 9, further comprising an indicator adapted to provide an indication based on the determination of the operating condition.

14. The apparatus of claim 9, further comprising a controller adapted to:
    enable at least one component of the transmitter only during the transmission of the pulse; and
    disable the at least one component of the transmitter if the pulse is not being transmitted.

15. The apparatus of claim 9, further comprising a controller adapted to enable at least one component of the receiver for only a duration of the selected one of the subintervals of the hop interval.

16. An apparatus for testing a transceiver, comprising:
    means for transmitting a signal at a first time, wherein transmitting the signal at the first time comprises transmitting pulses during respective subintervals of a hop interval;
    means for receiving the signal at a second time, wherein receiving the signal at the second time comprises enabling the receiver for receiving the signal at the second time, wherein the second time is related to a selected one of the subintervals of the hop interval;
    means for generating samples of at least one of the pulses and noise during an entire duration of the hop interval; and
    means for determining an operating condition of the transceiver based on the first and second times, wherein the operating condition comprises a timing of enabling the transmitting means of the transceiver for transmitting the signal or a timing of enabling the receiving means of the transceiver for receiving the signal, wherein the means for determining is configured to determine the timing of enabling the receiver by at least analyzing the samples to determine whether the at least one of the pulses was received during the selected subinterval of the hop interval.

17. The apparatus of claim 16, further comprising:
means for enabling at least one component of the receiving means for only a duration of the selected one of the subintervals of the hop interval; and
means for analyzing samples of the received signal taken during the entire duration of the hop interval.

18. A computer program product, comprising:
a non-transitory computer readable medium comprising codes executable by an apparatus to:
define a hop interval consisting of a specified number of subintervals;
transmit a signal at a first time, wherein transmitting the signal at the first time comprises enabling the transmitter for transmitting a pulse at the first time, wherein the first time is related to a selected one of the subintervals of the hop interval, the pulse being the only pulse transmitted during the hop interval;
receive the signal at a second time, wherein receiving the signal at the second time comprises generating samples of the pulse and noise during an entire duration of the hop interval; and
determine an operating condition of a transceiver based on the first and second times, wherein the operating condition comprises a timing of enabling a transmitter of the transceiver for transmitting the signal or a timing of enabling a receiver of the transceiver for receiving the signal, wherein determining the timing of enabling the transmitter comprises analyzing the samples to determine whether the pulse was received during the selected subinterval of the hop interval.

19. The computer program product of claim 18, wherein determining the timing of enabling the transmitter comprises:
defining a specified number of hop intervals including said hop interval, wherein each hop interval consists of a specified number of subintervals;
wherein transmitting the signal at the first time comprises enabling the transmitter for transmitting pulses at times related to selected subintervals of respective hop intervals, wherein only one of the pulses is transmitted during each hop interval;
wherein receiving the signal at the second time comprises generating samples of the pulse and noise during an entire duration of each of the hop intervals; and
analyzing the samples.

20. The computer program product of claim 19, wherein analyzing the samples comprises generating respective running counts of values of samples corresponding to distinct time positions within each hop interval, the running counts continually being updated for each of the specified number of hop intervals, wherein determining the timing of enabling the transmitter comprises analyzing the running counts.

21. The computer program product of claim 20, wherein analyzing the running counts comprises determining whether the running counts indicate that statistically the pulses were received during the selected subintervals of respective hop intervals.

22. A headset, comprising:
a transceiver, comprising:
a transmitter adapted to transmit a signal at a first time, wherein transmitting the signal at the first time comprises enabling the transmitter for transmitting a pulse at the first time, wherein the first time is related to a selected one of subintervals of a hop interval, the pulse being the only pulse transmitted during the hop interval;
a receiver adapted to receive the signal at a second time, wherein receiving the signal at the second time comprises generating samples of the pulse and noise during an entire duration of the hop interval;
a processing system adapted to determine an operating condition of the transceiver based on the first and second times, wherein the operating condition comprises a timing of enabling the transmitter for transmitting the signal or a timing of enabling the receiver for receiving the signal, wherein determining the timing of enabling the transmitter comprises analyzing the samples to determine whether the pulse was received during the selected subinterval of the hop interval; and
a transducer adapted to process data received by the receiver.

23. A watch, comprising:
a transceiver, comprising:
a transmitter adapted to transmit a signal at a first time, wherein transmitting the signal at the first time comprises enabling the transmitter for transmitting a pulse at the first time, wherein the first time is related to a selected one of subintervals of a hop interval, the pulse being the only pulse transmitted during the hop interval;
a receiver adapted to receive the signal at a second time, wherein receiving the signal at the second time comprises generating samples of the pulse and noise during an entire duration of the hop interval;
a processing system adapted to determine an operating condition of the transceiver based on the first and second times, wherein the operating condition comprises a timing of enabling the transmitter for transmitting the signal or a timing of enabling the receiver for receiving the signal, wherein determining the timing of enabling the transmitter comprises analyzing the samples to determine whether the pulse was received during the selected subinterval of the hop interval; and
a user interface adapted to generate an indication based on data received by the receiver.

24. A sensing device, comprising:
a transceiver, comprising:
a transmitter adapted to transmit a signal at a first time, wherein transmitting the signal at the first time comprises enabling the transmitter for transmitting a pulse at the first time, wherein the first time is related to a selected one of subintervals of a hop interval, the pulse being the only pulse transmitted during the hop interval;
a receiver adapted to receive the signal at a second time, wherein receiving the signal at the second time comprises generating samples of the pulse and noise during an entire duration of the hop interval;
a processing system adapted to determine an operating condition of the transceiver based on the first and second times, wherein the operating condition comprises a timing of enabling the transmitter for transmitting the signal or a timing of enabling the receiver for receiving the signal, wherein determining the timing of enabling the transmitter comprises analyzing the samples to determine whether the pulse was received during the selected subinterval of the hop interval; and
a sensor adapted to process data for transmission by the transmitter.

* * * * *